United States Patent
Sejkora

(10) Patent No.: US 6,639,350 B1
(45) Date of Patent: Oct. 28, 2003

(54) ILLUMINATION ARRANGEMENT

(75) Inventor: Günther Sejkora, Schwarzenberg (AT)

(73) Assignee: Zumiobel Staff GmbH, Dornbirn (AT)

(*) Notice: Subject to any disclaimer, the term of this patent is extended or adjusted under 35 U.S.C. 154(b) by 0 days.

(21) Appl. No.: 09/612,947

(22) Filed: Jul. 10, 2000

Related U.S. Application Data

(63) Continuation of application No. PCT/EP99/00310, filed on Jan. 19, 1999.

(30) Foreign Application Priority Data

| Feb. 5, 1998 | (DE) | ............. 198 04 569 |
| Jun. 15, 1998 | (DE) | ............. 198 26 548 |

(51) Int. Cl.⁷ .............. H01J 1/62; H01J 63/04
(52) U.S. Cl. .............. 313/483; 313/493; 313/486; 362/216; 362/223; 362/26
(58) Field of Search .............. 313/483, 485, 313/493, 504, 486; 362/216, 223, 26

(56) References Cited

U.S. PATENT DOCUMENTS

| 3,351,753 A | | 11/1967 | Berger | 313/113 |
| 4,488,208 A | * | 12/1984 | Miller | 362/223 |
| 4,948,228 A | * | 8/1990 | Keens | 359/485 |
| 4,975,814 A | | 12/1990 | Schairer | 362/240 |
| 5,008,789 A | * | 4/1991 | Arai et al. | 313/486 |
| 5,272,410 A | | 12/1993 | Fox | 313/113 |
| 5,502,626 A | * | 3/1996 | Armstrong et al. | 362/216 |
| 6,091,195 A | * | 7/2000 | Forrest et al. | 313/504 |
| 6,309,080 B1 | * | 10/2001 | Sasako et al. | 362/26 |
| 6,404,125 B1 | * | 6/2002 | Garbuzov et al. | 313/564 |

FOREIGN PATENT DOCUMENTS

| AT | A-301/87 | 12/1987 | |
| EP | 0354468 A | 2/1990 | ............. B60Q/1/30 |
| EP | 0756132 A | 1/1997 | ............. F21Q/1/00 |
| GB | 1365507 | 9/1974 | ............. F21V/5/00 |

OTHER PUBLICATIONS

U.S. patent application Ser. No. 09/580,192, filed May 26, 2000.
U.S. patent application Ser. No. 09/764,421, filed Jan. 19, 2001.
U.S. patent application Ser. No. 09/764,423, filed Jan. 19, 2001.

* cited by examiner

*Primary Examiner*—Nimeshkumar D. Patel
*Assistant Examiner*—Mariceli Santiago
(74) *Attorney, Agent, or Firm*—Fitzpatrick, Cella, Harper & Scinto

(57) ABSTRACT

Illumination arrangement (2), profiled bodies (5) of a light permeable material being formed in a base body (4), which profiled bodies are spaced apart from one another by means of recesses (6). To each profiled body there is applied a luminous means (7) which emits light into the corresponding profiled body. The light is directed internally by the profiled body (5) to an emission surface of the base body (4) in such a manner that it emerges there within a maximum emission angle range, to avoid dazzling an observer. As luminous means (7) a flat fluorescent lamp can in particular be employed.

29 Claims, 4 Drawing Sheets

ILLUMINATION ARRANGEMENT

CROSS-REFERENCE TO RELATED APPLICATIONS

This is a Continuation of copending International Application No. PCT/EP99/00310, filed Jan. 19, 1999.

BACKGROUND OF THE INVENTION

1. Field of the Invention

The present invention relates to an illumination arrangement which comprises an illumination means and a light permeable base body having light permeable profiled bodies formed by recesses in the base body to direct light from the illumination means to a light emission surface of the base body. In particular an illumination arrangement which can be used in light fittings, display screens etc. .

2. Description of the Related Art

Illumination arrangements of the kind set out above are for example also employed as covers or screens for light fittings. Thereby it is already known to use screens having profiled bodies formed and projecting on the side towards a lamp of the lamp fitting, for directing the light of the lamp of the light fitting, in order to restrict the emission direction of the light rays, for reducing dazzling of an observer. In GB-A-1365507 it is proposed for this purpose to form the profiled bodies in the shape of truncated pyramids, which project from the base body of the screen, the upper bounding surfaces of the truncated pyramids being coated with a light impermeable material. In U.S. Pat. No. 3,351,753 there is likewise proposed a screen having profiled bodies in the shape of truncated pyramids, whereby however in this case the side surfaces of the truncated pyramids and the intermediate spaces between the truncated pyramids are coated with a light impermeable material.

By means of these known screens there is achieved a directing of light suitable for restricting the angle of emission of the light rays, but due to the non-transparent regions of the screen the efficiency of the light fitting is reduced. In AT-A-301/87 there was therefore proposed a screen for light fittings likewise having pyramid-like profiled bodies, which are arranged in a matrix form on the side of the base body of the screen towards the lamp of the light fitting and having an upper bounding surface running parallel to the emission surface of the screen, the entire screen being of a transparent material.

The individual glass profiled bodies of this screen known from AT-A-301/87 are so configured that light emitted from the lamp of the light fitting onto the upper bounding surface of the individual profiled bodies is carried by the profiled bodies to the emission surface of the screen and emitted there within a predetermined maximum emission angle range. However, since this form of screen is preferably employed together with elongate fluorescent lamps, problems appear in the coupling of the light emitted from the lamp employed into the glass profiled body, since the lamp naturally irradiates not only the upper bounding surfaces of the individual profiled bodies but also the (light permeable) side faces of the truncated-pyramid-like profiled bodies. This, however, has the result that the desired maximum emission angle for avoiding dazzling of the observer cannot be maintained without further measures, since the light emitted from the lamp is not only directed towards the emission surface of the screen in the interior of the individual profiled bodies, but is also reflected or refracted at the side surfaces of the profiled bodies.

Further, there is known from EP 0 345 468 A2 an illumination arrangement as an broad area irradiator with which a plurality of luminescence semiconductor bodies, as luminous means, are applied to a light permeable base body in a extensive distribution. However, the base plate of this illumination arrangement has no profiled bodies for directing light, such as are for example known from the above-mentioned AT-A-301/87.

Moreover, there is disclosed in U.S. Pat. No. 5,272,410 an illumination arrangement which comprises an illumination means and a light permeable base body having light permeable profiled bodies formed by recesses in the base body to direct light from the illumination means to a light emission surface of the base body. The illumination arrangement is in this case a light emitting body, which can be used for example as tail light for motor vehicles. It consists of two plates of which at least one has a series of prismatic recesses the walls of which are coated with a phosphorescent layer. The recesses contain a gas under partial vacuum. At the ends of the glass plates electrodes are arranged by means of which, through gas discharge in the recesses, light is generated at the phosphorescent layer, which light is emitted in various directions. The outside of one of the two glass plates is provided with a reflecting layer, so that this reflector and the prismatic structure of the recesses provide that the light is so directed that it is emitted at the side of the body away from the reflector. With this illumination arrangement, however, the light is not emitted at a restricted angle of emission for reducing dazzling of an observer.

SUMMARY OF THE INVENTION

The present invention thus has the object of providing an illumination arrangement having profiled bodies formed in a base body with which on the one hand the above-described light coupling into the individual profiled bodies is facilitated and on the other hand a higher optical efficiency, preferably with sufficient anti-dazzling effect, is realized.

In accordance with the present invention this object is achieved by means of an illumination arrangement of the type described above in regard to U.S. Pat. No. 5,272,410, wherein the luminous means are applied to upper bounding surfaces of the profiled bodies and emit light into corresponding profiled bodies through upper bounding surfaces thereof. In other aspects, the invention also includes further features, as will be seen from the specification. The subclaims describe preferred embodiments of the present invention, which for their part contribute to a manufacturability of the illumination arrangement in accordance with the invention which is as efficient as possible and allows series production, or contribute to a best possible optical efficiency with best possible anti-dazzling effect.

In accordance with the present invention there is applied directly on the profiled bodies of the illumination arrangement in accordance with the invention (in particular on the upper bounding surfaces of the profiled bodies), a luminous means which emits light into the corresponding profiled body. The profiled bodies are of a light permeable material and, in their interior, direct the light emitted from the luminous means towards the emission surface of the illumination arrangement, where the light of the luminous means is emitted. Thereby, the individual profiled bodies are preferably so configured that the illumination arrangement at each arbitrary point of its emission surface emits the light of the luminous means within a predetermined maximum emission angle range of for example 60° to 70° in order to avoid a dazzling of an observer due to too flatly emitted light.

The individual profiled bodies may be formed for example in the manner of truncated pyramids, or elongate in the form of strips. As luminous means there may be considered for example a diffusely illuminating layer of organic or inorganic semiconductor materials, whereby electroluminescence is excited in these semiconductor materials by means of the application of electric voltage.

The profiled bodies of the illumination arrangement in accordance with the invention are separated from one another by means of recesses formed in the base body of the screen, whereby these recesses may in particular be V-shaped. The flanks of these recesses or the side flanks of the profiled bodies may be straight or curved. Advantageously, the side flanks of the profiled bodies are so formed as to be reflecting at their inner faces, so that the light is completely reflected within the profiled bodies. The same effect can be achieved by means of a configuration of the individual profiled bodies in such a way that in dependence upon the refractive index of the profiled bodies the light falls onto the inner faces of the side flanks of the profiled bodies exclusively at an angle of total reflection.

In accordance with a preferred exemplary embodiment, the individual profiled bodies are formed in a foil which is attached to a carrier of a light fitting, in particular glued thereto.

The advantage of the present invention consists in that the luminous means applied to the profiled bodies provide the light source for the corresponding illumination arrangement. If the luminous means are provided in the form of illuminating layers, a very flat illumination arrangement can correspondingly be realized. Since the luminous means are applied directly to the profiled bodies, with the illumination arrangement in accordance with the invention the above-described problem of light coupling does not appear in practice. Since a light fitting with the illumination arrangement in accordance with the invention does not need a lamp or lamp mounting, no lamp changing is needed. Such a light fitting has, depending upon the luminous means employed in each case, a long lifetime.

The lighting arrangement in accordance with the invention can be employed in particular in combination with one or more flat fluorescent lamps, which serve as luminous means and bear directly on the upper bounding surfaces of the profiled bodies. In this manner the above-described advantages of the present invention can be combined with the advantages of such fluorescent lamps, such as e.g. a flat configuration and a constant, high light density.

BRIEF DESCRIPTION OF THE DRAWINGS

The invention will be described below in more detail with reference to preferred exemplary embodiments.

DETAILED DESCRIPTION OF THE PREFERRED EMBODIMENTS

Figure 1:
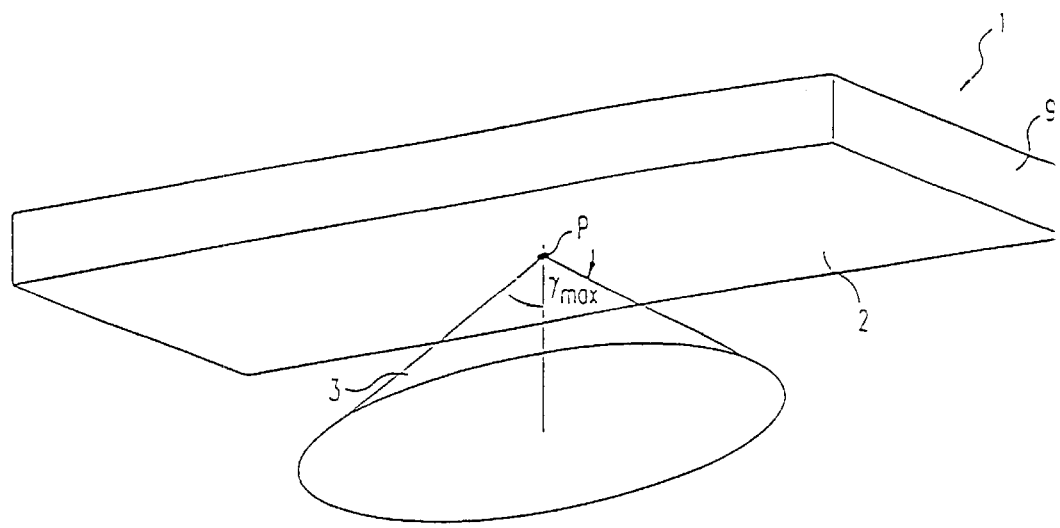
FIG. 1 shows schematically a perspective view of a light fitting having an illumination arrangement in accordance with the invention, in the form of a screen.

FIG. 1 shows a perspective view of a light fitting formed to be elongate, with which the illumination arrangement in accordance with the invention is employed as screen. As can be seen from FIG. 1, in the light fitting 1 an illumination arrangement or screen 2 is so held in a housing 9 that the emission surface of the screen 2 is directed downwardly. The emission surface of the screen 2 is preferably formed to be flat. The screen 2 and the profiled bodies formed therein (and not seen in FIG. 1) are so configured that light is emitted from the emission surface of the screen 2 at any arbitrary point P solely within a particular maximum emission angle (non-dazzling angle) $\gamma_{max}$. The emerging light rays correspondingly bound a conical surface 3. The relationships illustrated in FIG. 1 with regard to the point P apply analogously for all other points of the emission surface of the light fitting screen 2.

Figure 3:
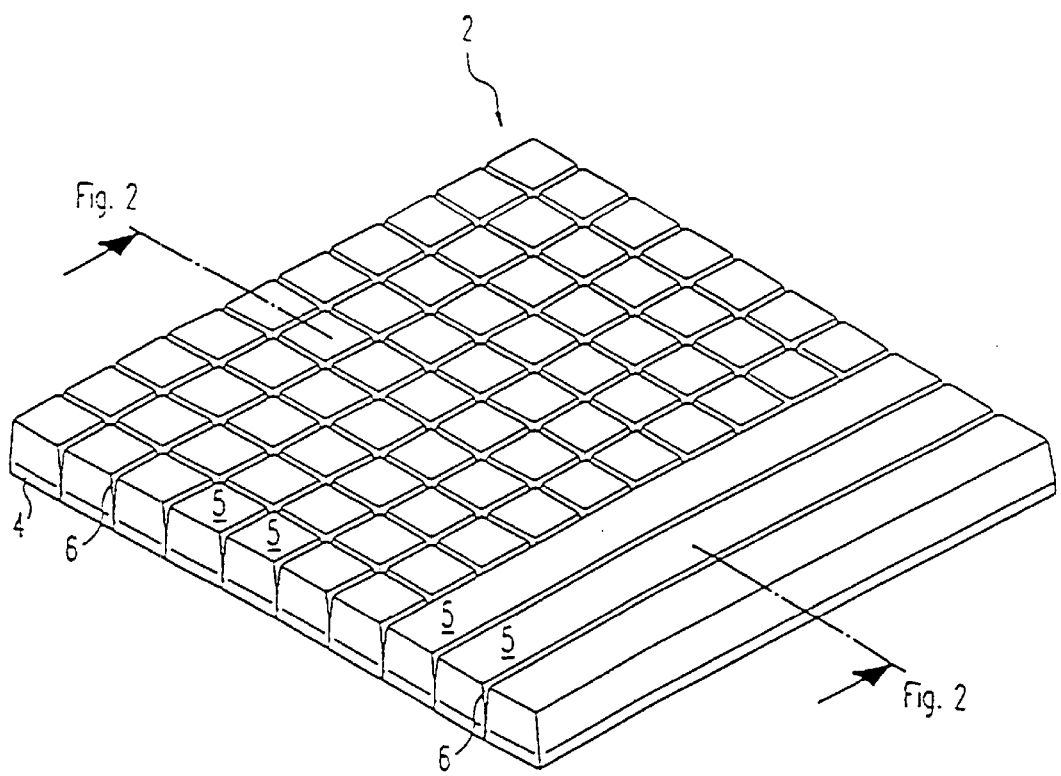
FIG. 3 shows a perspective view of a preferred exemplary embodiment of the illumination arrangement in accordance with the invention, whereby two different variants are illustrated in FIG. 3, FIGS. 4a and 4b show illustrations to an enlarged scale of a profiled body of the illumination arrangements illustrated in FIG. 2a or 2b, for explanation of the beam path within this profiled body.

FIG. 3 shows a perspective view from above of a preferred exemplary embodiment of an illumination arrangement or screen 2 in accordance with the invention. More precisely, FIG. 3 shows a view from above of the surface of the screen 2 towards the light fitting housing. The screen 2 has a plurality of profiled bodies 5 which are formed on or in a base body 4 of the screen 2. The individual profiled bodies 5 are spaced from one another by means of recesses 6. As is shown in FIG. 3, the profiled bodies 5 may have for example the form of truncated pyramids or elongate strips. If the profiled bodies 5 are formed in the shape of truncated pyramids, the profiled bodies can be arranged uniformly in rows and columns, i.e. in the manner of a matrix, so that the recesses 6 between the individual truncated pyramids 5 form a grid. If the profiled bodies 5 are formed in the shape of strips, these are preferably arranged parallel to one another, so that the recesses arranged therebetween also run parallel to one another.

Figure 2A:
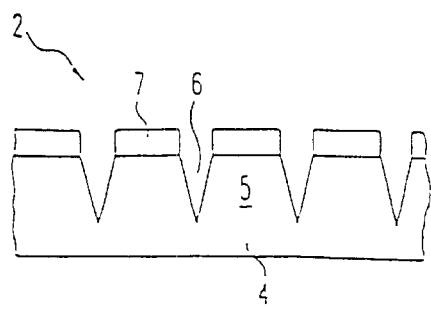
FIGS. 2a and 2b show cross-sectional views of the lighting arrangement in accordance with the invention, according to first and second exemplary embodiments of the present invention.
Figure 2B:
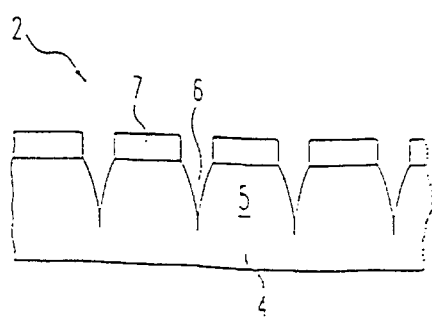

FIGS. 2a and 2b show exemplary cross-sectional views of the illumination arrangement in accordance with the invention, along the chain-line section line illustrated in FIG. 3. Thereby, in FIGS. 2a and 2b, the side flanks of the individual profiled bodies are differently formed.

It is common to the exemplary embodiments illustrated in FIGS. 2a and 2b that the individual profiled bodies 5 are separated by recesses 6 developing in substance V-shaped. The side flanks of the individual profiled bodies 5 fall away relatively steeply. On the underside of the base body 4, which represents the emission surface of the screen 2, there adjoins a substantially plane parallel section, which does not in substance affect the beam path and is so formed in that the individual V-shaped incisions 6 cannot be carried completely through up to the underside of the base body 4.

The profiled bodies 5 are preferably produced in one piece with the base body 4 of a light permeable material. The entire base body 4 including the profiled bodies 5 may be for example of acrylic glass. Advantageously, however, the base body 4 can be configured in the shape of a light permeable plastics foil in which the individual profiled bodies 5 are formed analogously to the known glass profiled body configuration. This plastics foil is then simply attached to a rectangular carrier of the light fitting, for example by gluing. By means of the employment of the plastics material, the manufacture of the base body 4 and the provision of the profiled bodies 5 in the base body 4 can be facilitated.

In accordance with the present invention, a luminous means 7 is applied on each profiled body 5. Preferably, the luminous means 7 is formed by means of a relatively thin illumination layer, which is applied directly onto the upper bounding surface of each profiled body 5 and which may have a thickness of <1 mm. Each luminous means 7 emits light directly into the interior of the corresponding profiled body 5. The profiled bodies 5 are preferably so configured that the light is completely reflected at the inner faces of their side flanks and directed towards the underside of the base body 4, i.e. to the emission surface of the screen 2. Further, the individual profiled bodies 5 satisfy geometrical conditions in order to be able to keep to the maximum emission angle $\gamma_{max}$ shown in FIG. 1. The illumination layer 7 may for example be of an inorganic or organic semiconductor material and be applied by means of screen printing onto the individual profiled bodies 5.

As is shown in FIG. 2a, the side flanks of the profiled bodies 5 or of the V-shaped recesses 6 may be straight. Instead of this, however, the bowed or curved development of these side flanks shown in FIG. 2b is also possible.

As has already been explained, there may be employed as luminous means 7 for the profiled bodies 5 shown in FIGS. 2a and 2b for example organic or inorganic semiconductor materials. In dependence upon the respectively employed material, these materials are excited to be illuminated (electroluminescence) by the application of a d.c. or a.c. voltage. Corresponding electroluminescent foils or plates are already known.

Thus, the luminous means 7 may be formed for example by means of an electroluminescence illumination layer having luminous crystals arranged in a dielectric, whereby there is applied to the luminous layer, via ITO electrodes (Indium-Tin-Oxide), an electrical voltage for exciting the electroluminescence. Such electroluminescence illumination layers may have a thickness of <1 mm. Further, there can be employed as luminous layer a polymer film to which a electric voltage is applied likewise via ITO electrodes. Upon application of the electric voltage positive charge carriers (holes) and negative charge carriers (electrons) are injected, whereby these different charge carriers recombine with the emission of light rays. The polymer film may for example be of PPV and have a thickness of <1 µm. As luminous layer there can also be employed an arrangement of light emitting layers arranged one over another, which each emit light of different wavelengths, so that overall white light is emitted from the luminous layer. In general, in accordance with the present invention, luminous means are preferably employed which emit diffuse light.

Has as already been explained, the individual profiled bodies must satisfy certain geometrical conditions, so that—as is shown in FIG. 1—light is emitted from the emission surface of the illumination arrangement or screen 2 exclusively in the range $0°<\gamma_{max}$, to avoid dazzling an observer. These geometrical conditions depend in particular upon the refractive index of the luminous means 2 shown in FIG. 2, the refractive index of the material of the profiled bodies 5 and the selected maximum emission angle (anti-dazzle angle) $\gamma_{max}$. Preferably, as maximum emission angle $\gamma_{max}$, there is selected an angle of 60°. In general, however, maximum emission angles $\gamma_{max}$ in the range 60° to 70° are sufficient.

Figure 4A:
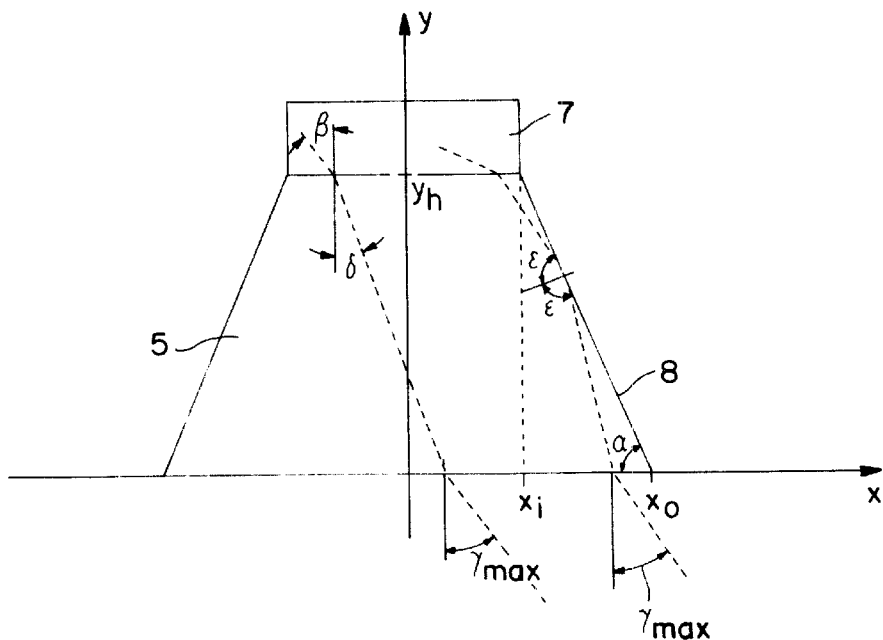
Figure 4B:
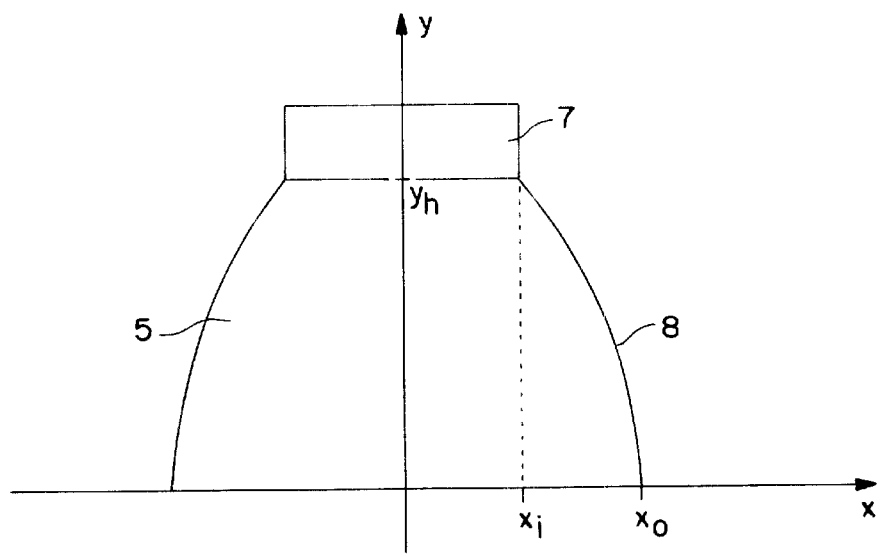

The geometrical conditions of the respectively employed profiled bodies will be explained in more detail with reference to FIGS. 4a and 4b. FIGS. 4a and 4b show 2D-projections of the profiled bodies 5, with luminous layers 7 applied thereto, illustrated in FIGS. 2a and 2b.

As is shown in FIG. 4a, light rays are emitted from the luminous layer 7 into the interior of the corresponding profiled body 5. These rays can leave the profiled body 5 without reflection at the side flanks 8 of the profiled body 5, which is indicated in FIG. 4a by means of the left ray path. Likewise, it is however also possible that certain light rays emitted from the luminous layer 7 are reflected at a side flank 8 of the profiled body 5 and only thereafter are emitted at the underside of the profiled body 5, which is indicated in FIG. 4a by means of the right ray path. In each case, the light rays emitted from the luminous layer 7 are refracted twice, namely once at the boundary surface between the luminous layer 7 and the profiled body 5 and a second time at the underside of the profiled body 5, when the light rays again leave the profiled body 5 and are emitted. In the following it is taken that $n_L$ is the refractive index of the luminous layer 7 and $n_S$ is the refractive index of the structural block or profiled body 5.

The directing of light within the profiled body 5, or the light emission from the profiled body 5, should substantially fulfill two conditions. On the one hand no light ray emitted from the luminous layer 7 into the profiled body 5 should be refracted sideways out of the profiled body 5, i.e. the light rays of the luminous layer 7 should emerge at the underside of the profiled body 5, either without reflection at the side flanks 8 of the profiled body 5, or being totally reflected at the side flanks 8 of the profiled body 5. Further, no light ray should leave the lower surface of the profiled body 5 with an angle which is greater than the desired maximum emission or anti-dazzle angle $\gamma_{max}$. Advantageously, this maximum emission angle $\gamma_{max}$ is 60° in order for example in the case of employment of the illumination arrangement for room illumination, to attain an optimum anti-dazzle effect.

As has been explained above, the light rays emitted from the luminous layer 7 are refracted upon passing into the profiled body 5, in dependence upon the refractive index $n_L$ of the luminous layer 7 and the refractive index $n_S$ of the structural block or profiled body 5. Thereby, the following relationship exists between the angle of incidence β and the angle of refraction δ, in accordance with the laws of refraction:

$$\frac{\sin\beta}{\sin\delta} = \frac{n_S}{n_L} \qquad (1)$$

In general upon a transition into an optically denser material, light rays are refracted towards the normal, whilst upon passing into an optically less dense material the light rays are refracted away from the normal. This means in the present case that the light rays emitted from the luminous layer 7, for $n_S>n_L$, are refracted into the structural block or profiled body 5, i.e. towards the normal, whilst for $n_L<n_S$, the light rays are refracted away from the normal.

If $n_S<n_L$, there occurs, from a certain maximum angle of incidence $\beta_{max}$ a total reflection of the light rays emitted from the luminous layer 7 at the boundary surface to the profiled body, there applying:

$$\sin\beta_{max} = \frac{n_S}{n_L} \qquad (2)$$

This means that in this case rays meeting the boundary layer to the profiled body 5 which include an angle of incidence between $\beta_{max}$ and 90° to the normal are totally reflected.

Consequently, the angle δ can take up the following maximum value in accordance with formula (1):

$$\delta_{max} = \arcsin\frac{n_L}{n_S} \quad (3)$$

Of course, the above considerations apply also for the refraction of the light rays at the underside of the profiled body 5, whereby however in this case it is to be taken into consideration that for the refractive index n of air, n=1.

As has already been explained, the light rays meeting the inner surfaces of the side flanks 8 of the profiled body 5 should be totally reflected. This can be attained for example by means of a (light impermeable) mirroring of the inner surfaces of the side flanks 8, so that no light rays can be refracted sideways out of the profiled body 8. Instead of this, however, there can also be attained a total reflection analogous to the above-indicated formula (2) if it is ensured that the light rays meet the side surface 8 at an angle ε, with which—in accordance with the laws of refraction—the light rays are refracted completely into the optically more dense profiled body 5, i.e. the light rays must be incident with an angle $\epsilon > \epsilon_{min}$, whereby $$\sin\epsilon_{min} = \frac{1}{n_S} \text{ or } \epsilon_{min} = \arcsin\frac{1}{n_S} \quad (4)$$

In dependence upon the above-explained conditions, the geometrical dimensions of the profiled body 5 shown in FIG. 4a or 4b can be calculated, whereby these dimensions are in particular dependent upon the predetermined refraction indices nL and ns and the desired maximum anti-dazzle angle $\beta_{max}$. Thereby, in accordance with FIGS. 4a and 4b, it is assumed that the structural element or the profiled body 5 is arranged symmetrically to the y-axis and that the underside of the profiled body 5 forms the x-axis. Further, the profiled body 5 is to be so configured that the side flanks 8 run outwardly inclined from above downwardly. In the following, $Y_h$ indicates the height of the profiled body 5, $2x_i$ indicates the width of the upper bounding surface and $2x_a$ the width of the lower bounding surface of the profiled body 5.

With regard to the profiled body shape shown in FIG. 4a, along with the values for $x_i$, $x_a$ and $Y_h$, of interest is in particular also the angle of inclination α of the side flanks 8 of the profiled body 5. Due to the desired total reflection at the side flanks 8 of the profiled body 5 there is yielded by means of an evaluation of the above indicated known relationships the following condition for the angle of inclination α:

$$\alpha < 90° - \arcsin\frac{1}{n_S} + 90° - \arcsin\frac{n_L}{n_S} \quad (5)$$

Since the light rays in the profiled body 5 which are not reflected from the side flanks 8 should emerge at the underside with a maximum predetermined angle $\gamma_{max}$, there are provided also the following relationships:

$$\alpha < \frac{1}{2}\left(90° + \arcsin\left(\frac{1}{n_S} * \sin\gamma_{max}\right) + 90° - \arcsin\frac{n_L}{n_S}\right) \quad (6)$$

-continued $$\alpha > 90° - \frac{1}{2}\arcsin\left(\frac{1}{n_S} * \sin\gamma_{max}\right) \quad (7)$$

From the formulas (5)–(7) a suitable angle of inclination α can be determined and the desired value $x_i$ set. In dependence thereupon, the height $Y_h$ of the profiled body 5 can finally be determined in accordance with the following equation:

$$y_h = 2 * \cot\left(\arcsin\left(\frac{1}{n_S} * \sin\gamma_{max}\right)\right) * \\ x_i \Big/ \left(1 - \cot\left(\arcsin\left(\frac{1}{n_S} * \sin\gamma_{max}\right)\right)\Big/\tan\alpha\right) \quad (8)$$

The same procedure is possible in principle for the profiled body development shown in FIG. 4b. Thereby, however, due to the curved development of the side flanks 8 of the profiled body 5, it is assumed that the side flanks 8 develop in accordance with a predetermined function f(x), i.e. that:

$$y = f(x) \text{ for all } |x| > x_i \quad (9)$$

Thereby, in the following, it is assumed that suitable values for $x_i$, and $y_h$ are predetermined along with the development f(x), and in dependence thereupon solely the value $x_a$ is to be determined.

From the requirements relating to the total reflection at the side surfaces 8 of the profiled body 5 there is yielded the following condition:

$$|\arctan f'(x)| < \quad (10) \\ 90° - \arcsin\frac{1}{n_S} + \arctan\left(\left|\frac{y_h - f(x)}{x_i + x}\right|\right) \text{ for all } x \in [x_i; x_a]$$

For the anti-dazzle condition of the light rays reflected at the side flanks 8 of the profiled body 5 there are provided the following conditions:

$$|\arctan f'(x)| < \frac{1}{2}\left(90° + \arctan\left(\left|\frac{y_h - f(x)}{x_i + x}\right|\right) + \arcsin\left(\frac{1}{n_S} * \sin\gamma_{max}\right)\right) \quad (11)$$

$$\text{for all } x \in [x_i; x_a]$$

$$|\arctan f'(x)| > \frac{1}{2}\left(90° + \arctan\left(\left|\frac{y_h - f(x)}{x_i + x}\right|\right) + \arcsin\left(\frac{1}{n_S} * \sin\gamma_{max}\right)\right) \quad (12)$$

$$\text{for all } x \in [x_i; x_a]$$

Finally for the anti-dazzle condition with regard to the through the profiled body 5 without reflection at the side flanks 8, there is provided the following condition:

$$y_h > \tan\left(90° - \arcsin\left(\frac{1}{n_S} * \sin\gamma_{max}\right)\right) * (x_a + y_i) \quad (13)$$

In dependence upon the predetermined values for $x_i$ and $y_h$, the likewise predetermined function f(x) is now to be solved for all x with $|x| > x_i$, taking into account the above-indicated conditions (10)–(12), until a value for $X_a$ is found which fulfills the condition according to formula (13).

Figure 5A:
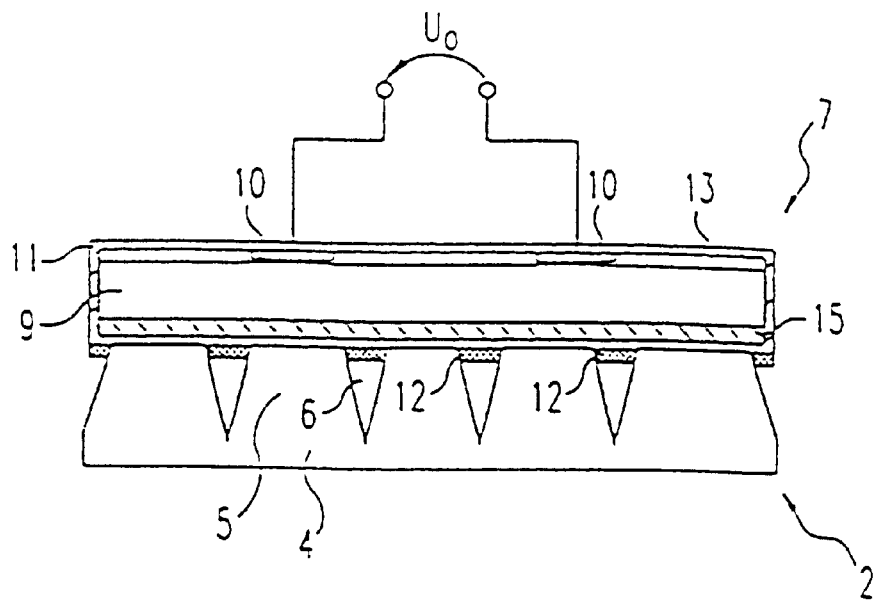
FIGS. 5a and 5b show cross-sectional views of the illumination arrangement in accordance with the present invention, according to third and fourth exemplary embodiments of the present invention.
Figure 5B:
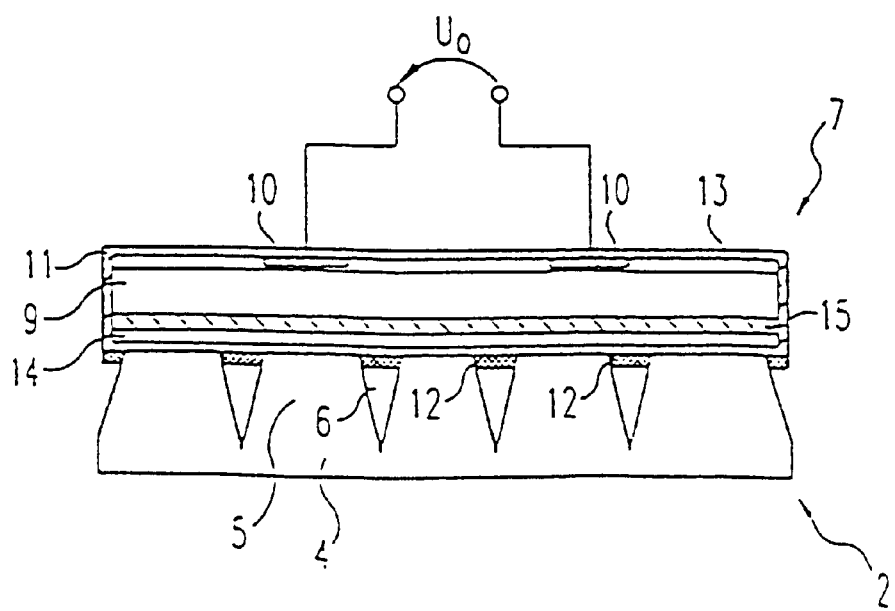

FIGS. 5a and 5b show further exemplary embodiments of the present invention, whereby a flat fluorescent lamp is employed as light source or luminous means 7.

Flat fluorescent lamps are recent developments in the field of area irradiators. Referring to FIG. 5a, such flat fluorescent lamps include a body 11 of a light permeable or transparent material, in particular a glass body, the inner chamber 9 of which is filled with a particular gas, e.g. xenon. By way of electrodes 10 arranged in the glass body 2, a suitable voltage $U_0$ is applied which excites the gas molecules in the inner chamber 9 of the glass body 2. Upon the decay of these excited gas molecules there arises a short wavelength UV radiation which with the aid of a corresponding fluorescent medium 15, with which the emission surface of the glass body 2 is coated, is converted into visible light and emitted. The efficiency of the generation of radiation can further be improved in that between the discharge or interior chamber 9 of the glass body 2 and at least one of the electrodes 10, an insulation 13 is arranged and/or a purposively selected pulsed voltage $U_0$ is applied.

Such fluorescent lamps can, due to their flat configuration and their even and high light density, be employed in various fields of application, in particular as background illumination for (LCD) display screens.

In accordance with an exemplary embodiment of the present invention it is provided that at least one such flat fluorescent lamp is employed as luminous means 7 for the profiled bodies 5 of the illumination arrangement 2. In particular, in each case a correspondingly small flat fluorescent lamp 7 can be applied to the upper bounding surface of a profiled body 5. For the purposes of clarity, however, there are illustrated in FIGS. 5*a* and 5*b* exemplary embodiments whereby such a flat fluorescent lamp serves as a common luminous means 7 for a plurality of profiled bodies 5 and is arranged directly on the upper bounding surfaces of the corresponding profiled bodies 5.

As is shown in FIG. 5*a*, the glass block raster structure (c.f. FIG. 3) in accordance with the invention, having a base body 4 of a light permeable material and a plurality of profiled bodies 4 (for example pyramid-like) formed in the base body 4, which are spaced from one another by means of recesses 6, is arranged directly behind the emission or light exit surface of the flat fluorescent lamp 7. In order to solve the above-explained problem of the light incident laterally on the side flanks of the profiled bodies 5 it is provided, in accordance with the exemplary embodiment shown in FIG. 5*a*, to so interrupt the fluorescent coating 15 applied in the glass body 11 of the flat fluorescent lamp 7 in correspondence to the recesses 6 between the profiled bodies, that the light emitted by the fluorescent lamp is transformed and emitted as visible light by the fluorescent layer 15 only in those regions where the upper bounding surfaces of the profiled bodies 5 bear on the emission surface of the fluorescent lamp 7. This can for example be realized in that a grid-network-like, light impermeable layer 12 is attached onto the emission surface of the glass body 11, in particular glued on or pressed on, so that the upper bounding surfaces of the profiled bodies 5 coincide with the intermediate spaces of the grid network of the above-mentioned light impermeable material 12, and bear directly on the emission surface of the glass body 11. In this way it is ensured that the visible light emitted from the fluorescent layer can enter only into the upper bounding surfaces of the profiled bodies 5.

The efficiency of the illumination arrangement 2 can be further improved in that the overall light exit surface of the flat fluorescent lamp 7 is coated with a material, known to the skilled person, which reflects UV light. A corresponding illumination arrangement is shown in FIG. 5*b*, whereby this layer 14, reflecting the UV light, is arranged in particular between the fluorescent layer 15 and the light exit or emission surface of the flat fluorescent lamp 7. Otherwise, the construction of the illumination arrangement shown in FIG. 5*b* corresponds to the illumination arrangement illustrated in FIG. 5*a*.

The exemplary embodiments shown in FIGS. 5*a* and 5*b* can be so modified that the glass body 11 of the flat fluorescent lamp 7 is so formed in the region of the light exit that it itself has the structure of the glass block raster, i.e. the profiled bodies 5 (and the base body 4) are in this case formed in one piece with the glass body 2 of the flat fluorescent lamp 7.

The profiled bodies 4 of the exemplary embodiments shown in FIGS. 5*a* and 5*b* also advantageously exhibit the above-explained properties with regard to a directing of light and anti-dazzle effect which is as effective as possible.

In addition to the above explanation, it is to be noted that the illumination arrangement in accordance with the invention may be considered for example for the background illumination of display screens, whereby the efficiency and the anti-dazzle effect can be improved in particular in that a profiled body 4 is associated with each image point or pixel of the display screen.

Further, the profiled bodies 5 may for example also be so configured that their "anti-dazzle angle" $\gamma_{max}$ is 90°, whereby in this case it can be ensured that the total radiation can emerge from the envelope surrounding the corresponding luminous means 7, in order to increase the efficiency. This applies in particularly to luminous means 7 in the form of electroluminescence lamps, the substrates of which are applied to glass plates as carrier material, since with such electroluminescence lamps up to 50% of the light radiation generated generally enters so flatly into the glass plates that due to total reflection it can no longer emerge.

Finally, the illumination arrangement in accordance with the invention can for example also be put to use in signalling equipment or the signal lights thereof, such as e.g. traffic lights or brake lights, whereby in this case the profiled bodies 5 should be so configured, for the safety of road users etc., that their anti-dazzle angle $\gamma_{max}$ is 30°.

What is claimed is:

1. An illumination arrangement comprising:
   at least one luminous source which emits light, said luminous source including at least one flat fluorescent lamp which is arranged on the upper bounding surfaces of the profiled bodies;
   a base body of a light permeable material; and
   profiled bodies of a light permeable material, formed in the base body, said profiled bodies being in the form of truncated pyramids or elongate strips having upper bounding surfaces and side refractive surfaces with no reflecting layers and being spaced apart from one another by means of recesses, said profiled bodies being arranged to direct light emitted from the luminous source to an emission surface of the base body from which light is emitted, the luminous source being arranged to apply light emitted therefrom exclusively onto said upper bounding surfaces of the profiled bodies and into the corresponding profiled bodies, said profiled bodies being arranged to irradiate light from said luminous source over a substantially flat emission surface of the base body, and wherein,
   the profiled bodies are so configured that they emit the light of the luminous source within a predetermined maximum angle of emission range ($\gamma_{max}$) with regard to the normal to the emission surface of the base body,
   said profiled bodies having an index of refraction relative to the index of refraction of the luminous source, and having side surfaces at an angle with respect to said emission surface, such that light rays received at said side surfaces from said upper bounding surfaces are refracted at said side surfaces toward said emission surface and such that light rays emerging from any point on said emission surface bound in a range bounded by a conical surface extending from said emission surface and having a maximum angle of about 70° with respect to a normal to said emission surface.

2. An illumination arrangement according to claim 1 wherein, the luminous source emits diffuse light into the profiled bodies.

3. An illumination arrangement according to claim 1 wherein, individual luminous sources are applied to the upper bounding surface of each profiled body.

4. An illumination arrangement according to claim 1 wherein, the luminous sources are applied in the form of a luminescent layer on the upper bounding surfaces of each of the profiled bodies.

5. An illumination arrangement according to claim 4 wherein, each luminescent layer has a thickness<1 mm.

6. An illumination arrangement according to claim 1 wherein, the luminous source is so configured that it emits light upon the application of an electrical voltage.

7. An illumination arrangement according to claim 6 wherein, the luminous source includes a polymer material which operates as a light emitting material.

8. An illumination arrangement according to claim 1 wherein, the luminous source includes an organic or inorganic semiconductor material which operates as light emitting material.

9. An illumination arrangement according to claim 1, wherein, said luminous source comprises a flat fluorescent lamp arranged on each profiled body.

10. An illumination arrangement according to claim 1 wherein,
the flat fluorescent lamp includes a body having a light emission surface and an inner chamber filled with gas molecules which, upon application of an electrical voltage are excited and decay to release UV radiation, and wherein
said flat fluorescent lamp has a fluorescent layer arranged neighboring the light emission surface, which layer transforms the UV radiation released by decay of the gas molecules into visible light, so that the visible light is irradiated through the light emission surface into the corresponding profiled body.

11. An illumination arrangement according to claim 10 wherein,
the flat fluorescent lamp is applied, as a common luminous source, to the upper bounding surface of a plurality of profiled bodies, and further including
a light limiter arranged to ensure that irradiation of visible light from the fluorescent layer is directed exclusively into the corresponding profiled bodies.

12. An illumination arrangement according to claim 1 wherein, the light emission surface of the flat fluorescent lamp is formed in one piece with the profiled bodies.

13. An illumination arrangement according to claim 1 wherein, a UV-light reflecting layer is arranged between the fluorescent layer and the light emission surface of the flat fluorescent lamp.

14. An illumination arrangement according to claim 1 wherein, the profiled bodies are formed to be elongate in the shape of strips and parallel to one another.

15. An illumination arrangement according to claim 1 wherein, the profiled bodies are formed each in the shape of a truncated pyramid and are so arranged that they are spaced apart from one another by means of recesses running in a grid-like manner.

16. An illumination arrangement according to claim 1, wherein, the recesses between the profiled bodies are in substance V-shaped.

17. An illumination arrangement according to claim 1 wherein, the profiled bodies have side flanks which are outwardly inclined from their respective luminous source toward the base body.

18. An illumination arrangement according to claim 17 wherein, the side flanks are straight or curved.

19. An illumination arrangement according to claim 17 wherein, each profiled body is so configured that the light of the corresponding luminous source which is irradiated into its interior is totally reflected within the profiled body at its side flanks.

20. An illumination arrangement according to claim 19 wherein, the side flanks of each profiled body are light impermeably mirrored at their inner faces.

21. An illumination arrangement according to claim 1 wherein,
a maximum angle of emission ($\gamma_{max}$) is 60° to 70° with reference to the normal to the emission surface of the base body.

22. An illumination arrangement according to claim 1 wherein, the maximum emission angle ($\gamma_{max}$) is 30° with reference to the normal to the emission surface of the base body.

23. An illumination arrangement according to claim 1 wherein, the base body is formed of a plastics foil of light permeable material.

24. In combination, an illumination arrangement according to claim 1 and a light fitting having a housing which contains the illumination arrangement, the base body of the illumination arrangement being arranged as a screen of the light fitting, and the luminous source being arranged as the light source of the light fitting.

25. In combination with the illumination arrangement according to claim 1, a display screen wherein, the illumination arrangement is arranged to illuminate the display screen.

26. The combination of claim 25 wherein, each profiled body is arranged to correspond to a different image point of the display screen.

27. In combination with an illumination according to claim 1, a signaling light fitting, wherein the luminous source which is applied to the profiled bodies of the illumination arrangement is arranged to serve as a light source for the signaling light fitting, and the profiled bodies of the illumination arrangement are so configured that they emit light within a certain maximum emission angle range ($\gamma_{max}$) of 30° with reference to the normal to the emission surface of the base body.

28. An illumination arrangement according to claim 1, wherein,
said maximum emission angle ($\gamma_{max}$) is 90° with reference to the normal to the emission surface of the base body.

29. An illumination arrangement comprising:
at least one luminous source which emits light, said luminous source including at least one fluorescent layer which is arranged on the upper bounding surfaces of the profiled bodies;
a base body of a light permeable material;
profiled bodies of a light permeable material, formed in the base body, each of said profiled bodies being in the form of truncated pyramids or elongate strips having upper bounding surfaces and side refractive surfaces with no reflecting layers, and being spaced apart from one another by means of recesses, said profiled bodies being arranged to direct light emitted from the luminous source to an emission surface of the base body from which light is emitted, the luminous source being arranged to apply light emitted therefrom to upper bounding surfaces of the profiled bodies and into the corresponding profiled bodies, the fluorescent layer being applied, as a common luminous source, to the upper bounding surface of a plurality of said profiled bodies; and a light limiter arranged to ensure that irradiation of visible light from the fluorescent layer is directed exclusively onto said upper bounding surfaces of the corresponding profiled bodies, said light limiter including a light impermeable layer having light exit openings arranged on a light emission surface of the fluorescent layer, whereby the light exit openings are so arranged that each light exit opening coincides with a corresponding profiled body, said profiled bodies having an index of refraction relative to the index of refraction of the luminous source, and having side surfaces at an angle with respect to said emission surface, such that light rays received at said side surfaces from said upper bounding surfaces are refracted at said side surfaces toward said emission surface and such that light rays emerging from any point on said emission surface in a range bounded by a conical surface extending from said emission surface and having a maximum angle of about 70° with respect to a normal to said emission surface.

* * * * *